US007873276B2

United States Patent

(12) United States Patent
Fan et al.

(10) Patent No.: US 7,873,276 B2
(45) Date of Patent: Jan. 18, 2011

(54) SYSTEM AND METHOD FOR REGISTRATION OF NETWORK UNITS

(75) Inventors: James Fan, San Ramon, CA (US); Dick Kwan, San Mateo, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 843 days.

(21) Appl. No.: 11/758,721

(22) Filed: Jun. 6, 2007

(65) Prior Publication Data

US 2008/0304834 A1 Dec. 11, 2008

(51) Int. Cl.
*H04J 14/00* (2006.01)

(52) U.S. Cl. ........................................................ 398/66

(58) Field of Classification Search .................... 398/66
See application file for complete search history.

(56) References Cited

U.S. PATENT DOCUMENTS 7,123,692 B2 10/2006 Atkinson et al.
2006/0256811 A1 11/2006 Saito et al.
2007/0274720 A1 * 11/2007 Menasco et al. .............. 398/66

* cited by examiner

*Primary Examiner*—Shi K Li

(57) ABSTRACT

A system and method for registration of network units is disclosed. A system that incorporates teachings of the present disclosure may include, for example, an optical network unit (ONU) in a passive optical network (PON) that can have a controller element to receive a registration code, send the registration code and a serial number of the ONU to an optical line terminal (OLT) that configures the ONU for temporary connectivity with the PON, and upon an expiration of the registration code or a termination of the temporary connectivity, re-send the serial number to the OLT to re-configure the connectivity with the PON. Additional embodiments are disclosed.

14 Claims, 6 Drawing Sheets

102
Ordering System (OS)
104
Inventory System (IS)
108
Provisioning System (PS)
106
Workforce Management System (WFS)
107
110
Element Management System (EMS)
109
HOME
ONU 116
118
111
Network
113
PON
OLT 112
MDU 119
PON
ONU 116
ONU 116
ONU 116
100

500

SYSTEM AND METHOD FOR REGISTRATION OF NETWORK UNITS

FIELD OF THE DISCLOSURE

The present disclosure relates generally to optical networks, and more specifically to registration of network units.

BACKGROUND

Deployments of Passive Optical Networks (PONs) have recently focused on two technologies: broadband PON (BPON) which is an Asynchronous Transfer Mode (ATM)-based system, and gigabit PON (GPON) which is a generic framing method (GEM) that supports both Ethernet and Time Division Multiplexing (TDM) traffic. GPON can provide a higher speed down link than BPON, for example, to provide video services.

To offer a customer with GPON or BPON access services, a technician is deployed to the customer's residence or commercial establishment to install an optical network unit (ONU). During the installation, the technician calls a processing center to confirm a proper installation of the ONU. If the ONU fails, the technician must repeatedly call the processing center for each installation of a new ONU. These calls increase the installation time and the cost associated with the installation.

Moreover, the service processing center may not be aware if the ONU is replaced with an unapproved ONU, or removed and re-installed at an unauthorized location. As one example, a malicious user may attempt to enter an unauthorized registration number in a stolen ONU in an effort to obtain free connectivity. In another example, a user may attempt to connect an illegal ONU to the GPON by sending a stolen registration number. In such cases, the ONU or the registration code is susceptible to theft if the registration process does not securely associate the ONU to the GPON.

A need therefore arises for a system and method for registration of network units.

DETAILED DESCRIPTION

Figure 1:
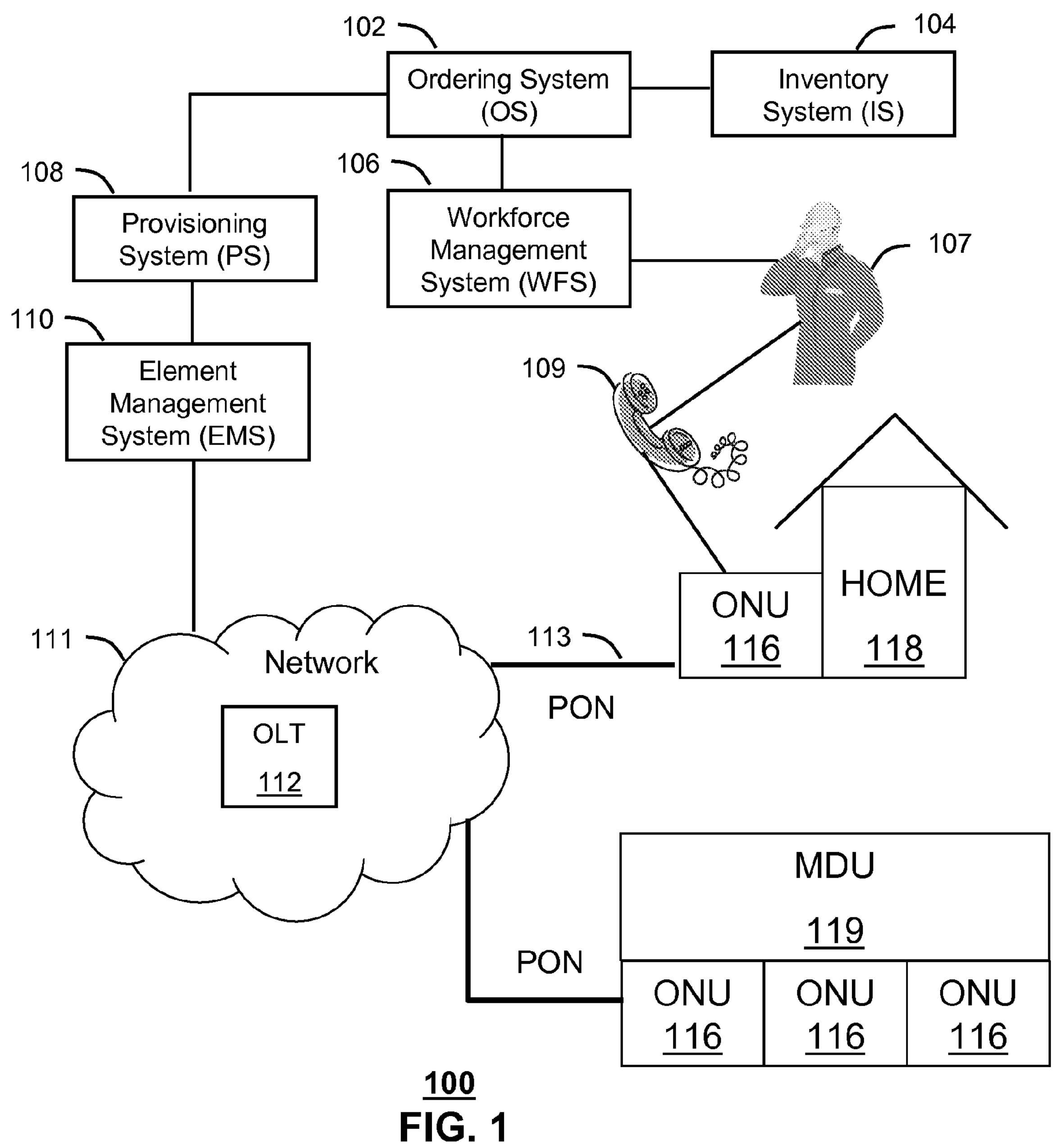
FIG. 1 depicts an exemplary embodiment of a portion of a Gigabit passive optical network (GPON) communication system.

Embodiments in accordance with the present disclosure provide a system and method for registration of network units.

In a first embodiment of the present disclosure, in a passive optical network (PON) that includes an optical line terminal (OLT) and a plurality of optical network units (ONUs), a method for registration to associate an ONU with a registered location of an entity is provided. The method can include the steps of, in a registration code mode, provisioning an installation for the ONU at the registered location, and configuring the ONU for temporary connectivity with the PON responsive to the OLT confirming that a registration code received by the ONU matches a provisioned registration code stored on the OLT, and upon an expiration of the registration code, terminating the temporary connectivity, and switching to a serial number mode to re-configure the connectivity when a stored serial number previously presented to the OLT by the ONU during the provisioned installation matches a serial number of the ONU at the registered location.

In a second embodiment of the present disclosure, an optical network unit (ONU) in a passive optical network (PON) can have a controller element to receive a registration code, send the registration code and a serial number of the ONU to an optical line terminal (OLT) that configures the ONU for temporary connectivity with the PON, and upon an expiration of the registration code or a termination of the temporary connectivity, re-send the serial number to the OLT to re-configure the connectivity with the PON.

In a third embodiment of the present disclosure, an Optical Line Termination (OLT) in a passive optical network (PON) can have a controller element to connect an ONU to the PON through a dual registration process. The controller element can configure the ONU for temporary connectivity with the PON during a provisioned installation responsive to confirming that a registration code received by the ONU matches a provisioned registration code stored on the OLT, and upon at least one of an expiration of the registration code or a termination of the temporary connectivity, the controller element can switch to a serial number mode to re-configure the connectivity when a stored serial number previously presented to the OLT by the ONU during the provisioned installation matches a serial number of the ONU at the registered location.

In a fourth embodiment of the present disclosure, a system for registration of an optical network unit (ONU) in a passive optical network (PON) can have the ONU; and an Optical Line Termination (OLT) to provide PON connectivity to the ONU, wherein an installation of the ONU is provisioned by an Order System (OS) by first placing the OLT in a registration code mode to provide temporary connectivity to the ONU and thereafter placing the OLT in a serial number mode to re-configure the connectivity, wherein during the registration mode the OLT permits the installation of the ONU within an expiration time of a registration code, and during the serial number mode the OLT confirms a serial number of the ONU to re-configure the connectivity to the ONU, and wherein the installation corresponds to at least one among a new installation, a repair, a maintenance request, and an upgrade of the ONU.

In a fifth embodiment of the preset disclosure, a method for registration of a network device can involve entering a registration code mode to provide temporary connectivity to a network, wherein during the registration mode a line termination device permits the installation of the network device within an expiration time of a registration code; and entering a serial number mode to re-configure connectivity to the network, wherein during the serial number mode the line termination device confirms a serial number of the network device to re-configure the connectivity to the network device, and wherein the installation corresponds to at least one among a new installation, a repair, a maintenance request, and an upgrade of the network device.

In a sixth embodiment of the present disclosure, a computer-readable storage medium can have computer instructions for connecting a network device to a network through a dual registration process, wherein the network device is configured for temporary connectivity with the network during a provisioned installation responsive to confirming that a registration code received by the network device matches a provisioned registration code stored on a line termination device, and wherein upon an expiration of the registration code or a termination of the temporary connectivity, a serial number mode is entered to re-configure the connectivity when a stored serial number previously presented to the line termination device by the network device during the provisioned installation matches a serial number of the network device at the registered location.

FIG. 1 depicts an exemplary embodiment of a portion of a Gigabit Passive Optical Network (GPON) communication system 100. The GPON communication system 100 comprises an Optical Line Termination (OLT) 112 coupled to one or more Optical Network Units (ONUs) 116 by way of one or more common splitters or combiners within the network 111. An ONU 116 can be attached to a single family unit (SFM) (herein residence 118), or multiple ONUs can be attached to a multi-family dwelling unit (MDU) 119. The ONU 116 can have a serial number that is specific to the ONU which can be used to identify the ONU 116. The ONU 116 provides connectivity to the PON 113 which serves as a means to provide triple-play services—voice, video, and data—to the residence 118.

The OLT 112 and ONUs 116 can operate according to a GPON Transmission Convergence (GTC) protocol and can utilize a controller comprising common computing technology for routing digital traffic between end points of the PON communication system 100. Digital traffic can include Constant Bit Rate (CBR) traffic such as a voice and/or video, non-deterministic traffic such as common Internet traffic, and Operations, Administrative and Management (OAM) data traffic represented by network management functions that provide network fault indication, ONU initialization, performance information, and data and diagnosis functions among other things.

The PON communication system 100 can include an ordering system 102 to issue or receive service orders, an Inventory System (IS) 104 communicatively coupled to the OS 102 to associate an ONU 116 with a residence 118, a Provisioning System (PS) 108 communicatively coupled to the OS 102 for provisioning an installation or maintenance of the ONU 116 at the residence 118, an Element Management System (EMS) communicatively coupled to the PS 108 for activating the PON connection 113 to the ONU 116, and the network 111 comprising one or more OLTs 112 for providing the PON connectivity 113.

The PON communication system 100 can include a workforce management system 106 (WMS) to receive service orders from the OS 102, and dispatch ONU work requests to one or more service technicians 107 to service the ONU 116 at the residence 116. The service technician can use a telephone butt-set 109 to communicate with the ONU 116 during installation, maintenance or repair of the ONU at the residence 118. The butt-set 109 can be used to enter a registration code into the ONU 116, which authorizes an installation or maintenance of the ONU 116 at the residence 118. The registration code is generated at the OS 102 and can be presented on the work order issued by the WMS 106.

ITU-T Recommendations G.983.1 "Broadband optical access systems based on Passive Optical Network (PON)" describes a series of processes called a ranging flow for establishing communications between OLT 112 and ONU 116 and installing ONU 116. The ranging process provides a function of determining the cell slot of each ONU 116 by measuring a distance between OLT 112 and ONU 116 and calculating a transmission time of an optical signal. When the distance is measured in the ranging process, it is necessary to make one ONU 116 after another respond in order to avoid collision of ONU 116 responses during measurements. To this end, OLT 112 can utilize a unique serial number assigned to each ONU 116. Namely, in the ranging process, OLT 112 stores the unique serial number of ONU 116 in a signal to be transmitted to ONU 116, and ONU 116 upon receipt of this signal responds if the serial number is its own serial number. ONU 116 whose serial number is recognized by OLT 112 and whose distance can be measured in the ranging process is assigned an identification number called a PON-ID, and thereafter messages are exchanged between OLT 112 and ONU 116 by identifying ONU 116 by PON-ID.

The exemplary embodiment can also be used with other types of communication systems that provide various services including IPTV, broadband internet, circuit switch services, VoIP, and so forth. The multi-step registration process described herein can be used with the registration of various network devices to the network through a line termination device. A window of registration, such as a temporary connectivity for a limited duration, can be used for temporarily providing connectivity to the network device and a serial number registration process can be used thereafter.

Figure 2:
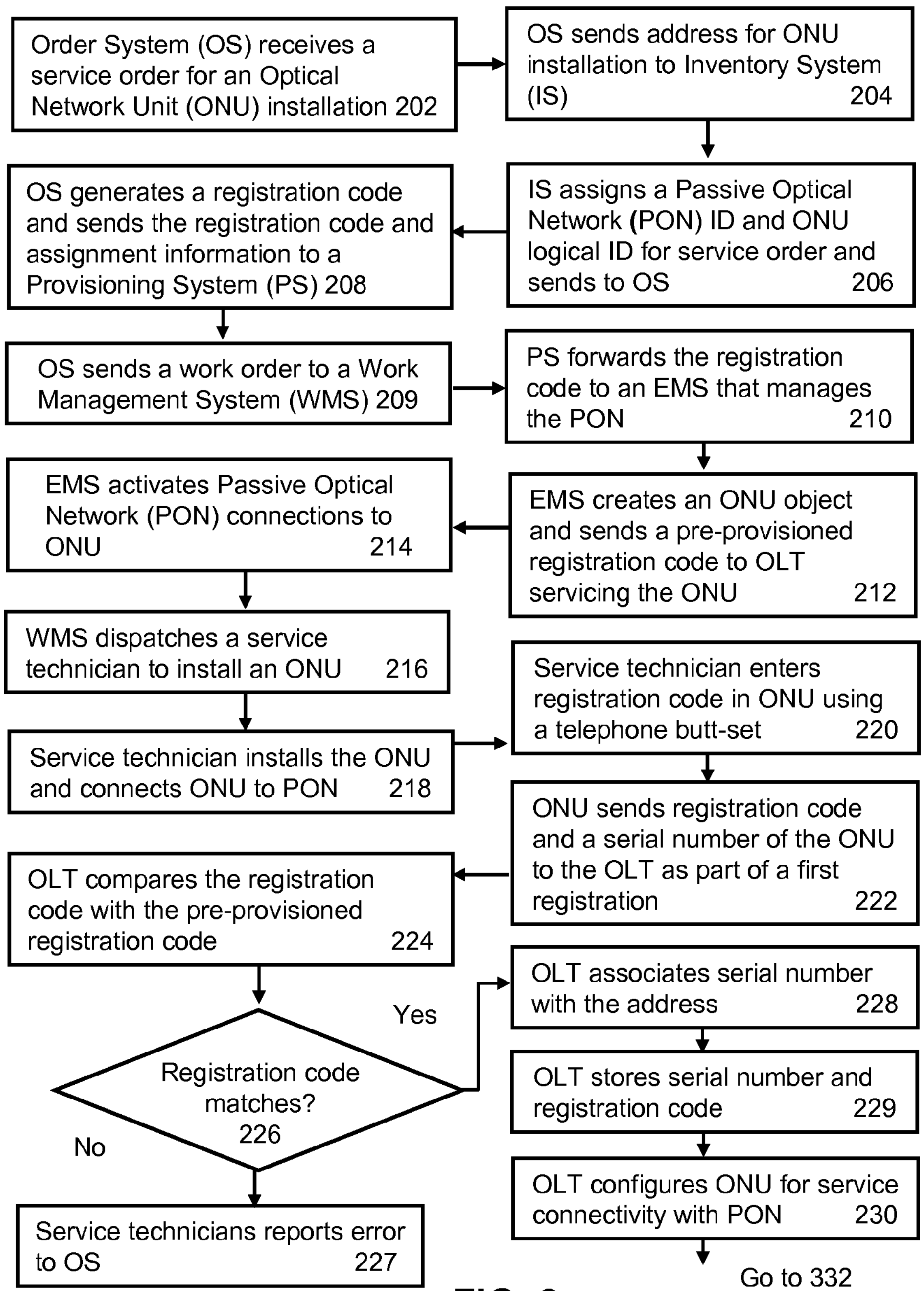
FIGS. 2-3 depicts an exemplary method operating in the GPON communication system.
Figure 3:
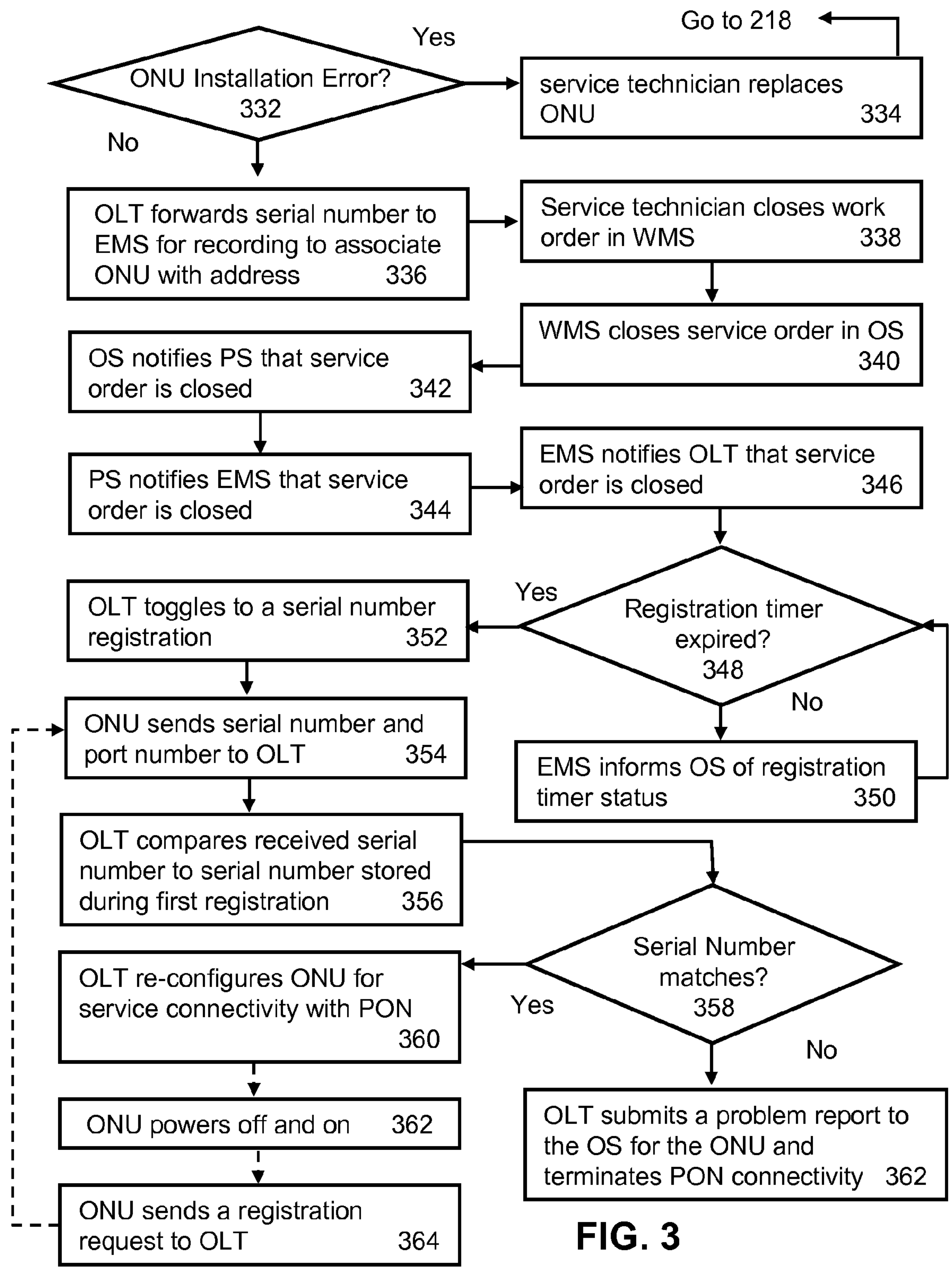

FIGS. 2-3 depict an exemplary method 200 operating in portions of the PON communication system 100. Briefly, the method 200 provides a means of dual registration to reduce the number of phone calls the service technician 107 is generally required to make to the OS 108 during an installation or maintenance of the ONU 116. Furthermore, the dual registration process provides a means for securely associating the ONU 116 to a registered location of the residence 118 to prevent theft or unapproved use of the ONU 116. While the exemplary illustration describes a dual mode registration process, the present disclosure contemplates additional modes of registration being utilized.

The method 200 can start at step 202 in which the OS 102 receives a service order for an ONU 116 installation. The term installation refers to both a new installation and a maintenance or upgrade of an existing ONU 116. For example, a customer at the residence 118 may call the OS 102 to request an ONU installation to receive converged audio, video, and media services. Alternatively, the customer may also request a service maintenance for an already installed ONU 116. At step 204, the OS 102 can send the address for ONU installation to the IS 104. The address can correspond to the physical address of the residence 118 (e.g., street address, mailing address). The IS 104 can assign a Passive Optical Network (PON) ID and ONU logical ID for the service order and can send this assignment information to the OS 102, as shown in step 206. Responsive to receiving the assignment information, the OS 102 at step 208 can generate a registration code and can send the registration code and assignment information to the PS 108. The OS 102 can also send a work order to the WMS 209 as shown in step 209. The work order can include the registration code, the assignment information, and any other information associated with the installation, such as the address, owner name, or any service feature requests.

At step 210, the PS 108 can forward the registration code to the EMS 110 that manages the PON 113 connection to the residence 118. The EMS 110 can then proceed to create an ONU object and send a pre-provisioned registration code to the OLT 112 servicing the ONU as shown in step 212. The pre-provisioned registration code can have an expiration time for keeping the service order open. At step 214, the EMS 110 can physically activate the PON 113 connections to the ONU 116.

At step 216, the WMS 106 can dispatch a service technician 107 to install the ONU 116. Upon arriving at the residence 118, the service technician 107 at step 218 can install the ONU 116 and connect the ONU 116 to the PON 113. The service technician 107 can enter the registration code into the ONU using the telephone butt-set 109 as in step 220. As an example, the service technician 107 can plug the telephone butt-set 109 to a port of the ONU 116 for entering the registration code. The registration code is presented on the work order received by the WMS 106. At step 222, the ONU 116 sends the registration code and the serial number of the ONU 116 to the OLT 112 as part of a first registration process.

During the first registration, the OLT 112 at step 224 compares the registration code received from the ONU 116 with the pre-provisioned registration code received from the EMS 110. If at step 226 the registration codes match, the OLT at step 228 associates the serial number received from the ONU 116 with the address of the residence 118, and stores the serial number and registration code at the OLT 112 as shown in step 229. The OLT 116 then proceeds to configure the ONU 116 for service connectivity with the PON 113. If during the installation, the registration codes do not match at step 226, the service technician reports the error to the OS 102. In such a case, the service technician can call the OS 102 to check the registration code to continue with the installation or maintenance. The method 200 can continue in FIG. 3.

If during the installation, the ONU 116 malfunctions, as shown in step 332 of FIG. 3, the service technician can replace the ONU as shown in step 334, and continue back to step 218 to install the new ONU. The service technician can repeat the step 220 of entering in the registration code for the new ONU. Steps 222-226 can be subsequently repeated to configure the ONU 116 to the PON 113. Moreover, the service technician can install new ONUs repeating the steps 218-216 until a suitable PON connection is established and the ONU 116 is registered with the PON 113.

After the ONU 116 is successfully registered and operational with the PON 113, the OLT 112 can forward the serial number to the EMS 110 for recording to associate the ONU 116 with the address of the residence 118 at step 336. The service technician can then proceed to close the work order in the WMS 106 as shown in step 338. The WMS 106 can close the service order in the OS 102 at step 340. The OS 102 can notify the PS 108 at step 342 that the service order is closed. At step 344, the PS can notify the EMS that the service order is closed, and at step 346 the EMS can notify the OLT that the service order is closed.

It should be noted that the first registration process described above can be a temporary registration process. That is, the registration code can have an expiration time, which upon expiration will terminate the temporary PON 113 connection if a second registration process is not completed within the expiration time. The expiration time allows the service technician to perform the ONU installation or repair of the ONU within a sufficient time period. The expiration time ensures that only during a certain time period can a new ONU be replaced or serviced on-site by a service technician, thereby providing reliability and security. The second registration process is conducted after the registration timer has expired, the temporary connectivity has been terminated, or when the service technician has left the residence and closed the work order.

It should also be noted that the first registration process can reduce the number of calls that need to be made by the service technician for installing the ONU 116. The OS 102 can provision the installation by providing a provisioned registration code to the EMS 110 that manages the OLT 112, and thus the PON 113 connection to the residence 118. The OLT 112 can receives the assignment information (e.g. PON ID, logical ID) from the EMS 110 which allows the OLT 112 to perform the same confirmation steps for the assignment information that the service technician would perform over the phone to the OS 102. In such regard, the service technician is not required to call the OS 102 to confirm the assignment information associated with the ONU installation, since the OLT 112 has the assignment information, and can confirm the installation locally.

Continuing with the method 200 in FIG. 3, if the registration timer expires at step 348, the OLT 112 can toggle to a serial number registration, as shown in step 352. The serial number registration corresponds to a secondary registration process to ensure that the ONU 116 is at a registered location, which can correspond to the address of the residence 118. During the registration period, the EMS 110 informs the OS 102 of the registration timer status, as shown in step 350. Upon the OLT 112 switching from the limited time registration code mode to the serial number mode, the ONU 116 at step 354 can then send the serial number and port number of the ONU to the OLT 112. The serial number specifically identifies the ONU 116, and allows the OLT to associate the ONU 116 with the address of the residence 118. The ONU 116 may send other descriptive information in addition to the serial number and port number.

At step 356, the OLT 112 can compare the received serial number from the ONU 116 to a serial number previously stored at step 222 during the first registration process. The OLT 112 may also compare other information provided during the first registration process, such as the port number of the ONU 116. This allows the OLT 112 to determine if the ONU 116 was removed from the registered location, or inserted at another location. If at step 358, the serial numbers match, and possibly the port numbers, the OLT 112 at step 360 can re-configure the ONU 116 for service connectivity with the PON 113. That is, the OLT 112 can re-confirm that the ONU 116 is at the registered location through verification of the serial number. Upon the completion of step 360, the ONU 116 is considered registered with the OLT for receiving services from the PON 113. The OLT 112 can remain in a serial number mode configuration upon the successful registering of the ONU 116. If however the serial numbers do not match at step 358, the OLT 112 can submit a problem report to the OS 102 for the ONU 116 and/or can terminate the PON 113 connectivity as shown in step 362.

In the event that the ONU 116 is powered off and on, as shown in step 362, the ONU can send a request to the OLT 112 upon powering up to re-register with the PON 113 as shown in step 364. The ONU can re-send the serial number and port number to the OLT as shown in step 354 and can continue through the same registration steps for the secondary registration. The OLT 112 can compare the received serial number to the serial number stored in memory that is associated with the address of the residence 118. Notably, the OLT 112 can remain in serial number mode unless otherwise directed by the OS 102. In such regard, the OLT 112 can determine if the user powers off the ONU 116 and installs it on a different port number of the PON 113 at a different location. This also allows the OLT 112 to determine if a user installs an unapproved ONU 116 in the residence.

The dual registration process exemplified by method 200 of FIGS. 2 and 3, ensures that an ONU is installed at a registered location. In one aspect, the method of dual registration can be practiced within the PON communication system in an effort to secure the ONU 116 to deter theft. The dual registration method can 1) eliminate the need for a service technician to make phone calls to NOC for ONT replacement activities, thus providing cost elimination, 2) prevent the customer from plugging in an unapproved ONT that is not assigned to the PON access network, thus providing security, 3) prevent the customer from using an illegal ONT by sending in a stolen registration code, thus providing security, 4) permit replacement when a proper service order is generated by the service provider, thus providing reliability and security, 5) allow verification of ONT serial number each time an ONT is powered on or reconnected, thus providing reliability and security, and/or 6) eliminate re-work orders due to installation of an ONT at a wrong site/home, thus providing cost elimination and security. Moreover, the method of dual registration complies to existing BPON/GPON standards for the "ranging" process and ONT serial number exchanges between ONT and OLT, thus providing cost elimination and reliability.

Figure 4:
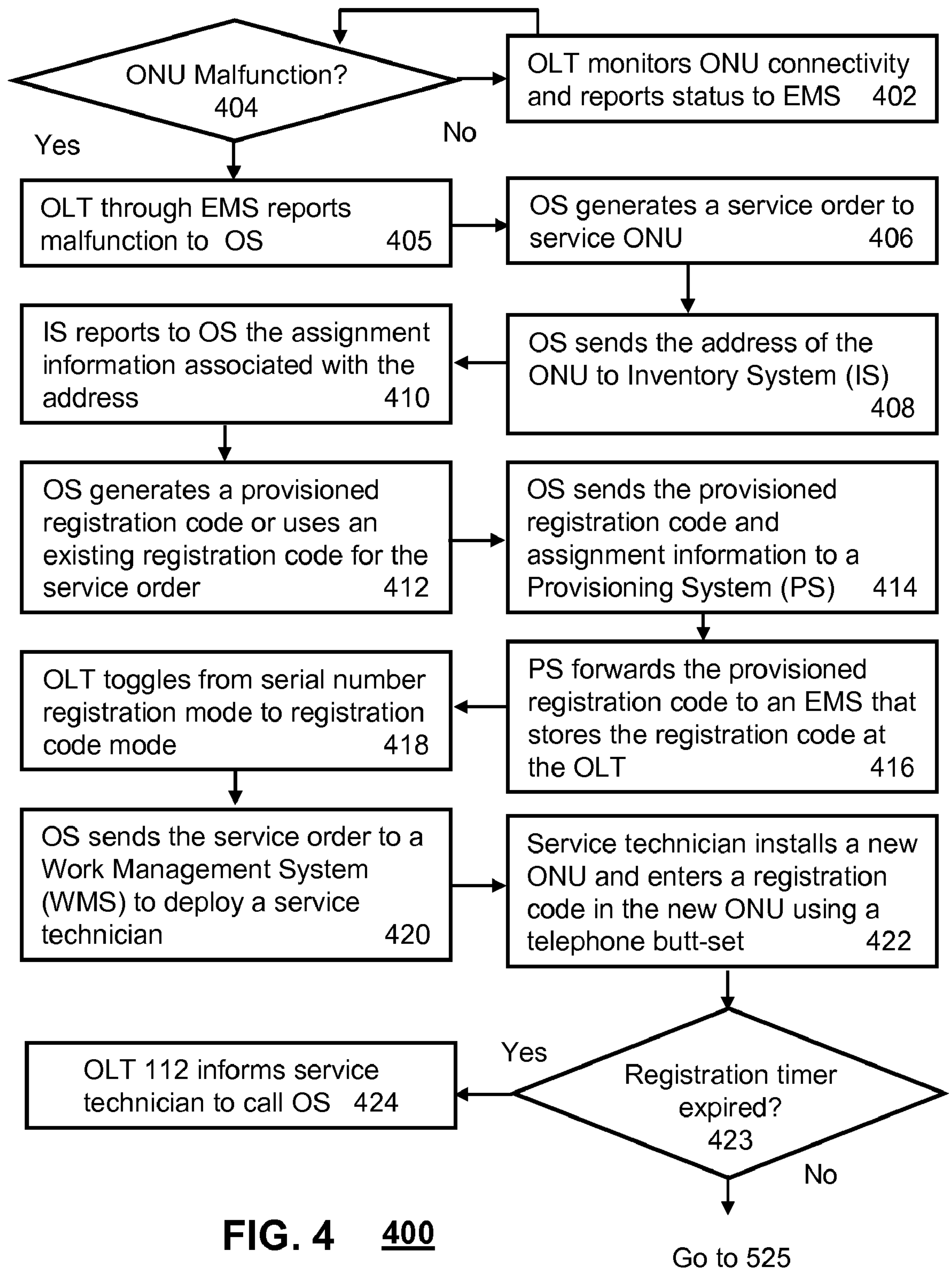
FIGS. 4-5 depicts another exemplary method operating in the GPON communication system.

Referring to FIG. 4, another exemplary method 400 operating in portions of the PON communication system 100 is shown. More specifically, the method 400 provides a means for updating or replacing an ONU in the PON communication system 100. As an example, the user may request a service upgrade for the ONU 116 or report a faulty operation of the ONU. The method 400 can begin at state 402, in which the OLT monitors the ONU connectivity and reports the status to the EMS 110. If at step 404 the OLT 112 identifies a malfunctioning of the ONU 116, or the ONU reports an error to the OLT 112, the OLT 112 can report the ONU malfunction to the OS 102 through the EMS 110, as shown in step 405. The OLT 112 can provide any information associated with the malfunction such as the port number, the number of packets transmitted per unit time, the time of the malfunction, the severity of the malfunction, or any devices connected to the ONU 116 possibly causing the malfunction. Alternatively or in combination therewith, a user at the residence 118 can directly report an ONU malfunction to the OS 102, for example by calling the OS 102.

At step 406, the OS can generate a service order to service the ONU at the address of the residence 118. In response, the OS 102 at step 408 can send the address associated with the ONU 116 to the IS 104. The IS 104 at step 410 can report to the OS 102 the assignment information previously associated with the address. Upon receiving the assignment information, the OS 102 can generate at step 412 a provisioned registration code for the service order. Alternatively, the OS 102 can use an existing registration code that may already be stored on the OLT 112 that is associated with the ONU 116. At step 414, the OS 102 can send the provisioned registration code and assignment information to the PS 108. At step 416, the PS 108 can forward the provisioned registration code to the EMS 110 which proceeds to store the registration code at the OLT 112. If a new registration code is received, the OLT 112 can replace the old registration code stored in an OLT database. In response to receiving the registration code, the OLT can toggle from serial number registration mode to registration code mode at step 418.

The OLT 112 can remain in serial number mode unless otherwise directed by the OS 102, for example, in response to receiving the provisioned registration code from the EMS 110. At step 420, the OS can send the service order to the WMS 106 to deploy a service technician 107 to the residence corresponding to the address associated with the ONU 116. At step 422, the service technician can install a new ONU and enters the registration code in the new ONU using the telephone butt-set 109. The OLT 112 can also determine if the service technician enters the registration code within a predetermined time limit set by the OS 102 through the registration code. If the OLT 112 determines the registration code has not been entered in the time limit as shown in step 423, the OLT can inform the service technician to call the OS 102, as shown in step 424. For example, the OLT 112 can send a message to the telephone butt set 109 coupled to the ONU 116 telling the service technician that the registration code has expired. The service technician 107 can then proceed to call the OS 102 to confirm the maintenance or upgrade of the ONU 116.

It should be noted that the service technician 107 can perform a repair or update of the existing ONU 116 without replacing the existing ONT. The OS 102 can provision the repair, update, or replacement by issuing the provisioned registration code to the OLT 112 to place the OLT in registration code mode. Recall, the OLT 112 can provision a registration time period in which the service technician can perform the service without having to call the OS 102 to confirm the service operation. During this time window the service technician does not need to provide the OS 102 with the assignment information (e.g. PON ID, logical ID) since the assignment information is confirmed by way of the OLT receiving the provisioned registration code.

Figure 5:
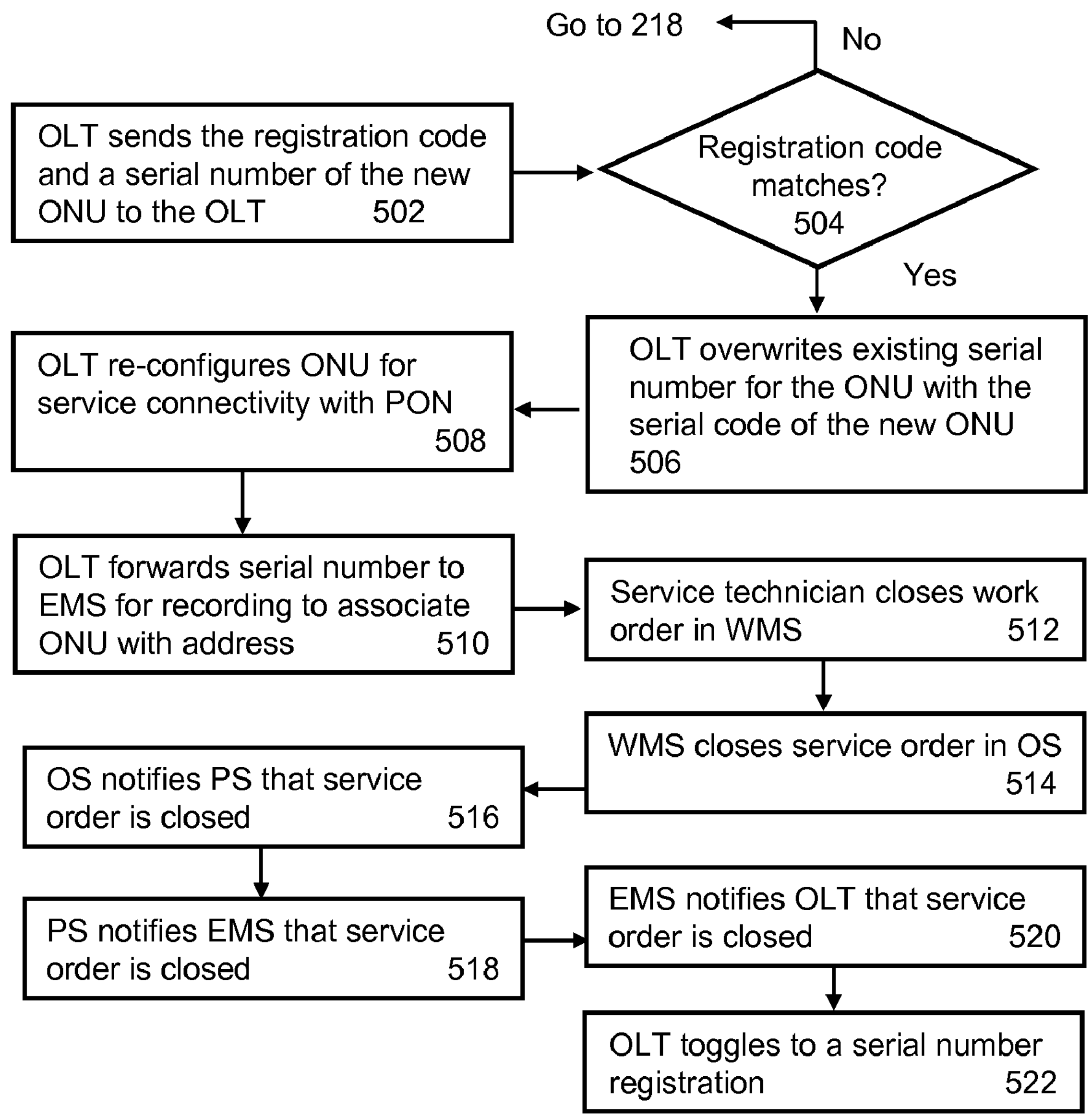

If the registration code is entered within the expiration time limit, the OLT can then send the registration code and a serial number of the new ONU to the OLT as shown in step 502 of FIG. 5, where the method 400 continues. At step 504, the OLT 112 compares the registration code with the provisioned registration code, and if the registration codes match, the OLT at step 506 can proceed to overwrite or otherwise update the existing serial number for the ONU associated with the serial number of the new ONU. Upon associating the new serial number with the ONU 116, the OLT 112 can re-configure the ONU 116 for connectivity with the PON 113 as shown in step 508. Thereafter, the OLT 112 can forward the serial number to the EMS for recording to associate the ONU 116 with the address of the ONU 116, as shown in step 510.

The Service technician then can close the work order in the WMS at step 512. The WMS can close the service order in OS at step 514, the OS can notify the PS that the service order is closed at step 516, and the PS can notify the EMS that the service order is closed at step 518. At step 520, the EMS can notify the OLT that service order is closed, and in response, the OLT toggles to serial number registration mode in step 522.

Notably, as shown by steps of method 400, the OS 102 can delegate service orders to elements within the PON communication system to temporarily place the OLT 112 in registration code mode and thereby remotely authorize maintenance repairs on the ONU by a qualified service technician. Upon completion of the authorized service task, the OLT returns to the serial number registration mode.

Figure 6:
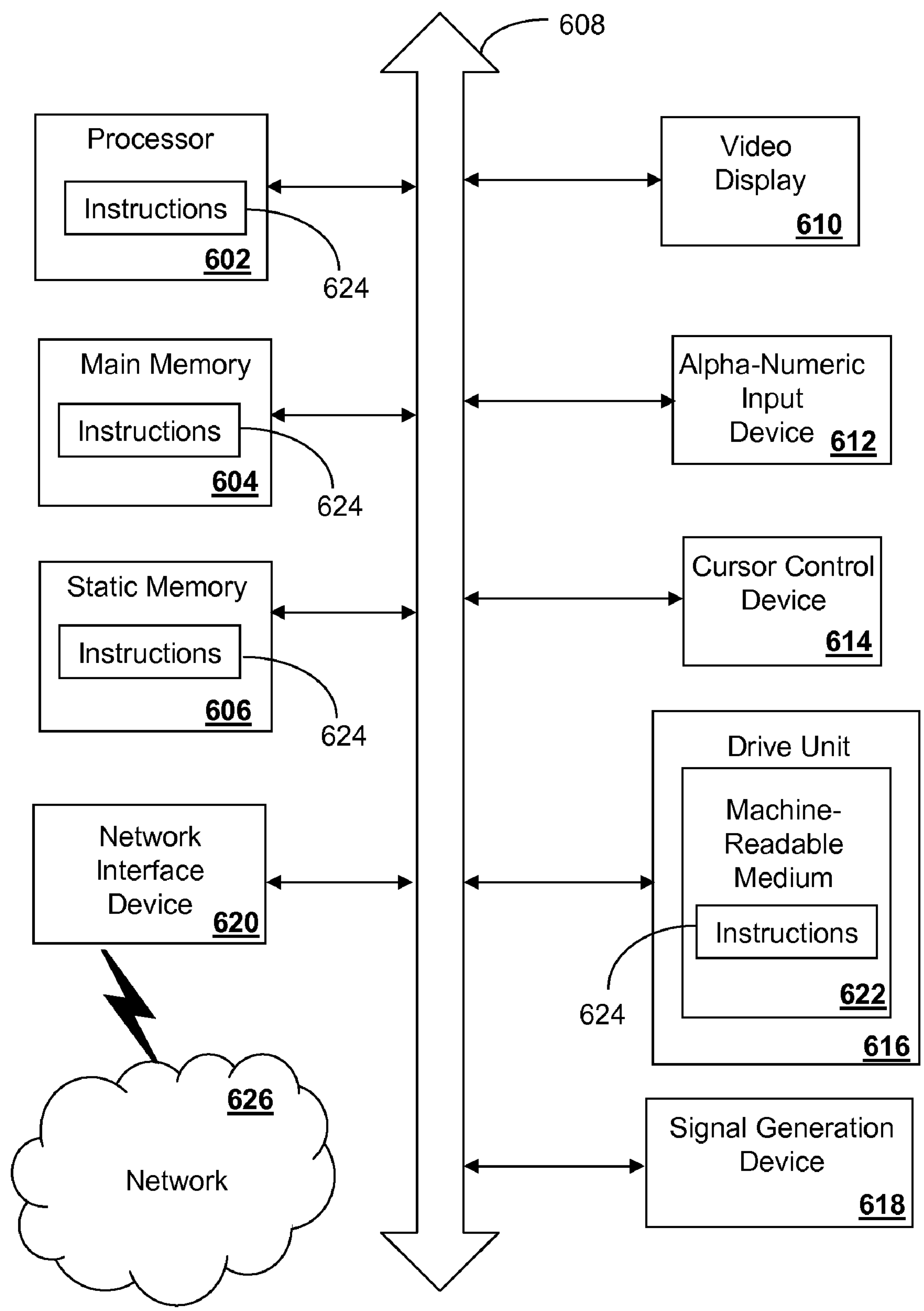
FIG. 6 depicts an exemplary diagrammatic representation of a machine in the form of a computer system within which a set of instructions, when executed, may cause the machine to perform any one or more of the methodologies disclosed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a mass storage medium 616, a signal generation device 618 (e.g., a speaker or remote control) and a network interface device 620.

The mass storage medium 616 may include a computer-readable storage medium 622 on which is stored one or more sets of instructions (e.g., software 624) embodying any one or more of the methodologies or functions described herein, including those methods illustrated above. The computer-readable storage medium 622 can be an electromechanical medium such as a common disk drive, or a mass storage medium with no moving parts such as Flash or like non-volatile memories. The instructions 624 may also reside, completely or at least partially, within the main memory 604, the static memory 606, and/or within the processor 602 during execution thereof by the computer system 600. The main memory 604 and the processor 602 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the computer-readable storage medium 622 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. In a passive optical network that includes an optical line terminal and a plurality of optical network units, a method for registration to associate an optical network unit with a registered location of an entity, the method comprising:

in a registration code mode, provisioning an installation for the optical network unit at the registered location, and configuring the optical network unit for a temporary connectivity with the passive optical network responsive to the optical line terminal confirming that a registration code received by the optical network unit matches a provisioned registration code stored on the optical line terminal; and upon an expiration of the registration code, terminating the temporary connectivity, and switching to a serial number mode to re-configure a connectivity when a stored serial number previously presented to the optical line terminal by the optical network unit during the provisioned installation matches a serial number of the optical network unit at the registered location.

2. The method of claim 1, wherein the installation is authorized within an expiration time of the registration code.

3. The method of claim 1, wherein the optical line terminal toggles from the serial number mode to the registration code mode responsive to an optical network unit replacement or an update request for provisioning at least one more installation.

4. The method of claim 1, wherein the installation corresponds to at least one of: a new installation, a repair, a maintenance request, and an upgrade of the optical network unit.

5. The method of claim 1, comprising:

entering the registration code through a telephone butt-set connected to a port of the optical network unit;

sending the registration code and the serial number of the optical network unit to the optical line terminal; and storing the serial number in the optical line terminal if the registration code matches the provisioned registration code.

6. The method of claim 1, comprising:

detecting a powering off and a powering on of the optical network unit;

receiving a request from the optical network unit to connect with the passive optical network; and re-configuring the connectivity to the passive optical network when the serial number of the optical network unit provided in the request matches the stored serial number within the optical line terminal.

7. The method of claim 1, comprising:

identifying at least one of: an operation failure of the optical network unit, an order request for a new optical network unit, and an order request for an optical network unit update;

provisioning a time period for updating or replacing the optical network unit responsive to the identifying; and temporarily switching from the serial number mode to the registration code mode to allow a service technician to update or replace the optical network unit within the time period.

8. An optical network unit in a passive optical network, the optical network unit comprising a controller element to:

receive a registration code;

send the registration code and a serial number of the optical network unit to an optical line terminal that configures the optical network unit for a temporary connectivity with the passive optical network; and upon at least one of: an expiration of the registration code or a termination of the temporary connectivity, re-send the serial number to the optical line terminal to re-configure a connectivity with the passive optical network, wherein the controller element is programmed to identify a port number of the passive optical network to which the optical network unit is connected, and send the port number to the optical line terminal during the registration code mode.

9. An optical line termination in a passive optical network, the optical line termination comprising:

a controller element to connect an optical network unit to the passive optical network through a dual registration process, wherein the controller element configures the optical network unit for a temporary connectivity with the passive optical network during a provisioned installation responsive to confirming that a registration code received by the optical network unit matches a provisioned registration code stored on the optical line termination, and wherein upon an expiration of the registration code or a termination of the temporary connectivity, the controller element switches to a serial number mode to re-configure a connectivity when a stored serial number previously presented to the optical line termination by the optical network unit during the provisioned installation matches a serial number of the optical network unit at the registered location, wherein the optical line termination receives a pre-provisioned registration code from an element management system that notifies the optical line termination to register an optical network unit installed at a registered location of an entity.

10. A system for registration of an optical network unit in a passive optical network, the system comprising:

the optical network unit; and an optical line termination to provide a passive optical network connectivity to the optical network unit, wherein an installation of the optical network unit is provisioned by an order system by first placing the optical line termination in a registration code mode to provide a temporary connectivity to the optical network unit and thereafter placing the optical line termination in a serial number mode to re-configure a connectivity, wherein during the registration mode the optical line termination permits the installation of the optical network unit within an expiration time of a registration code, and during the serial number mode the optical line termination confirms a serial number of the optical network unit to re-configure the connectivity to the optical network unit, and wherein the installation corresponds to at least one of: a new installation, a repair, a maintenance request, and an upgrade of the optical network unit, wherein the order system comprises:

a provisioning system to receive a registration code generated by the order system for provisioning the installation;

an element management system to receive the registration code from the provisioning system, create an optical network unit object, and send a pre-provisioned registration code to the optical line termination servicing the optical network unit; and a workforce management system to generate a work order with the registration code received from the order system, wherein the optical line termination connects the optical network unit to the passive optical network if the registration code entered from the work order in the optical network unit matches the pre-provisioned registration code in the optical line termination, and the installation is performed within the expiration time.

11. A system for registration of an optical network unit in a passive optical network, the system comprising:

the optical network unit; and an optical line termination to provide a passive optical network connectivity to the optical network unit, wherein an installation of the optical network unit is provisioned by an order system by first placing the optical line termination in a registration code mode to provide a temporary connectivity to the optical network unit and thereafter placing the optical line termination in a serial number mode to re-configure a connectivity, wherein during the registration mode the optical line termination permits the installation of the optical network unit within an expiration time of a registration code, and during the serial number mode the optical line termination confirms a serial number of the optical network unit to re-configure the connectivity to the optical network unit, and wherein the installation corresponds to at least one of: a new installation, a repair, a maintenance request, and an upgrade of the optical network unit, wherein the optical line termination switches to the serial number mode upon a closing of a work order or the expiration time of the registration code.

12. A system for registration of an optical network unit in a passive optical network, the system comprising:

the optical network unit; and an optical line termination to provide a passive optical network connectivity to the optical network unit, wherein an installation of the optical network unit is provisioned by an order system by first placing the optical line termination in a registration code mode to provide a temporary connectivity to the optical network unit and thereafter placing the optical line termination in a serial number mode to re-configure a connectivity, wherein during the registration mode the optical line termination permits the installation of the optical network unit within an expiration time of a registration code, and during the serial number mode the optical line termination confirms a serial number of the optical network unit to re-configure the connectivity to the optical network unit, and wherein the installation corresponds to at least one of: a new installation, a repair, a maintenance request, and an upgrade of the optical network unit, wherein the optical line termination prevents the installation of an unapproved optical network unit that is not assigned to the passive optical network.

13. A system for registration of an optical network unit in a passive optical network, the system comprising:

the optical network unit; and an optical line termination to provide a passive optical network connectivity to the optical network unit, wherein an installation of the optical network unit is provisioned by an order system by first placing the optical line termination in a registration code mode to provide a temporary connectivity to the optical network unit and thereafter placing the optical line termination in a serial number mode to re-configure a connectivity, wherein during the registration mode the optical line termination permits the installation of the optical network unit within an expiration time of a registration code, and during the serial number mode the optical line termination confirms a serial number of the optical network unit to re-configure the connectivity to the optical network unit, and wherein the installation corresponds to at least one of: a new installation, a repair, a maintenance request, and an upgrade of the optical network unit, wherein the optical line termination terminates a connectivity of an illegal optical network unit associated with a stolen registration code.

14. A method for registration of a network device, the method comprising:

entering a registration code mode to provide a temporary connectivity to a network, wherein during the registration code mode a line termination device permits an installation of the network device within an expiration time of a registration code;

entering a serial number mode to re-configure a connectivity to the network, wherein during the serial number mode the line termination device confirms a serial number of the network device to re-configure the connectivity to the network device, and wherein the installation corresponds to at least one of: a new installation, a repair, a maintenance request, and an upgrade of the network device;

receiving a registration code at a provisioning system that is generated by an order system for provisioning the installation;

receiving the registration code from the provisioning system at an element management system;

creating a network device object;

sending a pre-provisioned registration code to the line termination device that is servicing the network device; and generating a work order at a workforce management system with the registration code received from the order system, wherein the line termination device connects the network device to the network if a registration code entered from the work order in the network device matches the pre-provisioned registration code sent to the line termination device, and the installation is performed within the expiration time.

* * * * *